United States Patent [19]

MacDowell

[11] Patent Number: 4,576,920

[45] Date of Patent: Mar. 18, 1986

[54] $B_2O_3$—$P_2O_5$—$SiO_2$ GLASS-CERAMICS

[75] Inventor: John F. MacDowell, Painted Post, N.Y.

[73] Assignee: Corning Glass Works, Corning, N.Y.

[21] Appl. No.: 737,204

[22] Filed: May 23, 1985

[51] Int. Cl.[4] ................ C03C 10/02; C03C 3/097; C03C 3/064

[52] U.S. Cl. .................... 501/10; 501/63; 501/77

[58] Field of Search ............ 501/10, 63, 77

[56] References Cited

U.S. PATENT DOCUMENTS 3,519,445  7/1970  MacDowell et al. ............ 501/10
3,922,155  11/1975  Broemer et al. .................. 501/10
4,366,253  12/1982  Yagi ................................. 501/10

Primary Examiner—Mark L. Bell
Attorney, Agent, or Firm—C. S. Janes, Jr.

[57] ABSTRACT

This invention is directed to the production of transparent, translucent, or opaque glass-ceramic articles containing $BPO_4$ as the predominant crystal phase by heat treating precursor glass articles consisting essentially, expressed in terms of weight percent on the oxide basis, of about:

$SiO_2$: 10–50
$B_2O_3$: 5–35
$P_2O_5$: 25–75
$SiO_2 + P_2O_5 + B_2O_3$: >90.

2 Claims, 1 Drawing Figure

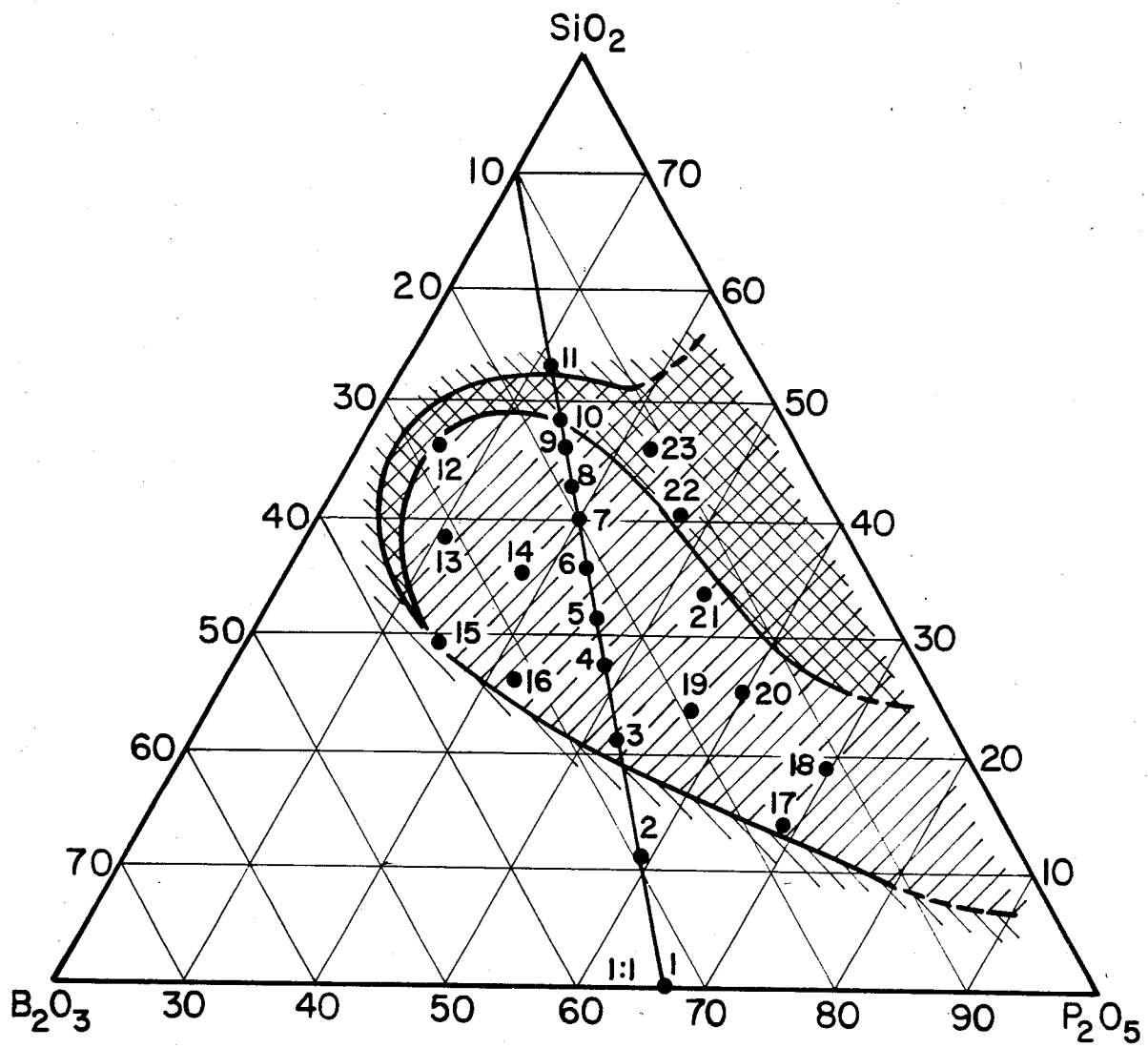

$B_2O_3$—$P_2O_5$—$SIO_2$ GLASS-CERAMICS

BACKGROUND OF THE INVENTION

The field of glass-ceramics is founded in U.S. Pat. No. 2,920,971. As is explained therein, glass-ceramic articles are produced through the controlled crystallization of precursor glass articles. The preparation of glass-ceramics typically involves three general steps: first, a glass-forming batch, often containing a nucleating agent, is melted; second, that melt is simultaneously cooled to a temperature at least within and commonly below the transformation range thereof and a glass body of a desired geometry shaped therefrom; and, third, that glass body is exposed to a temperature above the transformation range to cause the glass to crystallize in situ. Frequently, crystallization will be accomplished in two stages; viz., the glass body will initially be heated to a temperature somewhat above the transformation range to induce the generation of nuclei therein, after which the temperature is raised, often above the softening point of the glass, to effect the growth of crystals on those nuclei. Normally, the melted batch will be cooled sufficiently rapidly that devitrification of the glass is avoided. The transformation range has been defined as the temperature at which a molten mass becomes an amorphous solid, that temperature typically being deemed to reside in the vicinity of the annealing point of a glass.

The crystallization developed in a glass-ceramic is usually uniformly fine-grained, homogeneously dispersed throughout the body, and comprises a substantial proportion, often greater than 50% by volume, of the body. The residual glassy matrix therein will be a composition different from that of the parent glass since the components comprising the crystals have been removed therefrom. Glass-ceramic bodies are normally non-porous and free from voids. Because a glass-ceramic is prepared from a precursor glass body, the conventional glass forming methods of production such as blowing, casting, drawing, pressing, rolling, and spinning can be utilized.

SUMMARY OF THE INVENTION

The present invention is based upon the discovery of transparent, translucent, or opaque glass-ceramic bodies having compositions within the $B_2O_3$—$P_2O_5$—$SiO_2$ system which exhibit coefficients of thermal expansion (25°-300° C.) between about $45-65 \times 10^{-7}$/°C., thermal stability up to 1100° C., dielectric constants of about 4-5, loss tangents between $10^2$-$10^5$ Hz below 0.002, and D.C. resistivities up to $10^{16}$ ohm cm at 250° C. The inventive glass-ceramics contain $BPO_4$ as essentially the sole crystal phase and consist essentially, expressed in terms of weight percent on the oxide basis, of

- $SiO_2$: 10-50
- $B_2O_3$: 5-35
- $P_2O_5$: 25-75
- $SiO_2 + P_2O_5 + B_2O_3$: >90

Up to a total of 10% of a metal oxide selected from the group of BaO, CaO, CdO, $Li_2O$, MgO, $Na_2O$, $SnO_2$, SrO, and ZnO may be included, with individual amounts of each oxide not exceeding about 5%.

The scientific literature has described $BPO_4$ as a tetragonal polymorph of $\beta$-cristobalite, but it does not exhibit the catastrophic $\beta$-$\alpha$ inversion inherent in cristobalite. The melting or decomposition temperature of $BPO_4$ has not been determined precisely, but sublimation is adjudged to occur at about 1350° C. $BPO_4$ is believed to be thermally stable up to that point.

All additions of extraneous oxides to the $BPO_4$—$SiO_2$ pseudobinary, with the exception of $Al_2O_3$, appear to significantly decrease the kinetics of $BPO_4$ crystallization. $Al_2O_3$ additions cause the formation of $BPO_4$—$AlPO_4$—$SiO_2$ cristobalite solid solutions which, unlike the $BPO_4$ crystal, are subject to the severe displacive structural $\alpha$-$\beta$ inversion at about 190° C. As a consequence, glass-ceramics containing $AlPO_4$ crystals manifest higher coefficients of thermal expansion than corresponding $BPO_4$-containing bodies. Therefore, $Al_2O_3$ will preferably be essentially absent from the inventive compositions.

Production of the inventive materials contemplates three general steps:

First, a batch of a proper composition is melted;

Second, the melt is cooled to a temperature below the transformation range thereof and, simultaneously, a glass article of a desired geometry shaped therefrom; and Third, the glass article is exposed to a temperature between about 850°-1200° C. for a sufficient period of time to cause the development and growth of $BPO_4$ crystals therein. The glasses crystallize quite rapidly so about 0.5-2 hours may be adequate to obtain highly crystallized glass-ceramics. Considerably longer periods of heat treatment can be employed, but the properties of the final products are not altered to any substantial extent, except that the transparency thereof may be adversely affected due to light scattering resulting from excessive grain growth of the crystals.

Electron microscopy and x-ray diffraction analyses have indicated that the crystal content of the articles is high, i.e., at least 40% by volume and frequently greater than 60% by volume. The crystals, themselves, are essentially all finer grained than 10 microns in diameter and typically are less than 1 micron in diameter. X-ray diffraction studies have identified the presence of $BPO_4$ as essentially the sole crystal phase.

The appended drawing is a ternary diagram of the $SiO_2$—$B_2O_3$—$P_2O_5$ system illustrating the region of glass formation (cross-hatched) and the region of glass-ceramic formation (hatched). Outside the limits of stable glass formation (reverse hatched) toward the $B_2O_3$ apex, the formation of opal glass occurs. Toward the $SiO_2$ apex the glasses are stable, but their high liquidi and very high viscosities during melting preclude the preparation of homogeneous, inclusion-free melts utilizing conventional glass melting and forming techniques. Compositions along the $P_2O_5$—$SiO_2$ join, i.e., along a line where $P_2O_5$ and $SiO_2$ are present in essentially equal molar amounts, form stable glasses over a wide range, but $P_2O_5$ volatility impresses a practical limit on the $P_2O_5$:$SiO_2$ molar ratio at about 1:1.

The most preferred products have compositions along the $B_2O_3$—$P_2O_5$ join (shown in the appended drawing). The resulting glass-ceramic bodies contain very high levels of $BPO_4$ crystallization and the residual glassy matrix approaches the composition of pure silica. The crystals therein are extremely fine-grained, some less than 500 Å (0.05 micron) in diameter. The inventive articles are very resistant to thermal deformation, even to temperatures up to 1200° C., demonstrate excellent chemical durability, and may display optical transparency. This combination of properties recommends the utility of the inventive products in such widely-diverse applications as high temperature reinforcing fibers, optical lenses, and substrates for electronic components.

BRIEF DESCRIPTION OF THE DRAWING

The appended drawing represents a ternary diagram of the $SiO_2$—$B_2O_3$—$P_2O_5$ system illustrating compositions operable in the present invention.

RELATED APPLICATION

U.S. application Ser. No. 737,205, filed concurrently herewith in the names of G. H. Beall and J. F. MacDowell under the title *Hydrogen Containing Glass Microfoams and Gas-Ceramics*, discloses the use of $SiO_2$—$B_2O_3$—$P_2O_5$ compositions, inter alia, as base materials for the preparation of microporous glass and glass-ceramic bodies.

DESCRIPTION OF PREFERRED EMBODIMENTS

Table I records a number of glass compositions, expressed in terms of parts by weight on the oxide basis, illustrating the compositional parameters of the inventive products. (Those compositions are also entered on the appended drawing.) Because the sum of the individual components totals or closely approximates 100, for all practical purposes the value tabulated for each constituent can be deemed to reflect percent by weight. The actual batch ingredients may comprise any materials, either the oxide or other compound, which, when melted together, will be converted into the desired oxides in the proper proportions.

The batches were compounded, ballmilled to assist in obtaining a homogeneous melt, and charged into silica crucibles. The crucibles were covered, introduced into a furnace operating at about 1600° C., and the batches melted for about two hours. The melts were rolled into glass discs having dimensions of about 6" diameter and 0.25" thick and those discs were annealed overnight at about 550°–650° C. Table I also reports the $B_2O_3:P_2O_5:SiO_2$ (B:P:Si) mole ratio of each glass.

TABLE I

|  | 1 | 2 | 3 | 4 | 5 | 6 | 7 | 8 |
|---|---|---|---|---|---|---|---|---|
| $SiO_2$ | — | 12.4 | 22.1 | 27.4 | 32.1 | 36.2 | 39.8 | 43.1 |
| $P_2O_5$ | 67.1 | 58.8 | 52.3 | 48.7 | 45.6 | 42.8 | 40.4 | 38.2 |
| $B_2O_3$ | 32.9 | 28.8 | 25.6 | 23.9 | 22.3 | 21.0 | 19.8 | 18.7 |
| B:P:Si | 1:1:0 | 2:2:1 | 1:1:1 | 3:3:4 | 3:3:5 | 1:1:2 | 3:3:7 | 3:3:8 |

|  | 9 | 10 | 11 | 12 | 13 | 14 | 15 |
|---|---|---|---|---|---|---|---|
| $SiO_2$ | 46.0 | 48.6 | 53.1 | 46.0 | 39.0 | 35.6 | 29.9 |
| $P_2O_5$ | 36.3 | 34.5 | 31.4 | 27.2 | 30.8 | 38.6 | 35.4 |
| $B_2O_3$ | 17.7 | 16.9 | 15.4 | 26.7 | 30.2 | 25.8 | 34.7 |
| B:P:Si | 1:1:3 | 3:3:10 | 1:1:4 | 2:1:4 | 2:1:3 | 1.4:1:2.2 | 2:1:2 |

|  | 16 | 17 | 18 | 19 | 20 | 21 | 22 | 23 |
|---|---|---|---|---|---|---|---|---|
| $SiO_2$ | 26.8 | 14.5 | 19.5 | 24.2 | 25.3 | 33.7 | 40.4 | 45.9 |
| $P_2O_5$ | 42.2 | 68.7 | 69.2 | 57.2 | 60.0 | 53.2 | 47.8 | 43.5 |
| $B_2O_3$ | 31.0 | 16.8 | 11.3 | 18.7 | 14.7 | 13.0 | 11.7 | 10.6 |
| B:P:Si | 3:2:3 | 1:2:1 | 1:3:2 | 2:3:3 | 1:2:2 | 1:2:3 | 1:2:4 | 1:2:5 |

Samples suitable in configuration for use in conducting tests for various physical and chemical properties were cut from each disc and those samples, plus the remainder of each disc, were introduced into an electrically-heated furnace. Although more or less rapid heating rates can be employed, as a matter of convenience the temperature within the furnace was raised at a rate of about 5° C./minute to the crystallization temperature recorded in Table II (except for a 50° C./hour nucleation ramp between 700°–800° C.), and that temperature maintained for the period of time also cited in Table II. In like manner, whereas faster or slower rates for cooling the bodies to room temperature can be operable, as a matter of convenience the electric power to the furnace was merely cut off and the furnace permitted to cool with the bodies retained therewithin. This method of cooling has been termed "cooling at furnace rate" and averages about 2°–3° C./minute.

Table II also records a visual description of the crystallized products, the crystal phases identified by x-ray diffraction analysis and electron microscopy, the relative quantity of each phase corresponding to the x-ray diffraction peak heights (5=major, 1=minor), along with some measurements of coefficient of thermal expansion over the range of 25°–300° C. in terms of $\times 10^{-7}/°C$. and of density (g/cc) determined in accordance with standard techniques.

TABLE II

| Example | Heat Treatment | Visual Description |
|---|---|---|
| 1 | None | Coarse-grained, white |
| 2 | None | Fine-medium-grained, translucent |
| 2 | 900°-2 hrs | Medium-fine-grained, white, slightly porous |
| 3 | None | Very slightly hazy glass |
| 3 | 900°-2 hrs | Very fine-grained hazy-transparent |
| 3 | 1000°-2 hrs | Very fine-grained, translucent, white |
| 3 | 1200°-2 hrs | Fine-grained, white, glazed surface |
| 4 | 900°-2 hrs | Glassy transparent, slight haze |
| 4 | 1000°-2 hrs | Very fine-grained, translucent, white |
| 4 | 1200°-2 hrs | Fine-grained, white, glazed surface |
| 5 | 900°-2 hrs | Glassy transparent, slightly cracked |
| 5 | 1000°-2 hrs | Glassy translucent, white |
| 5 | 1200°-2 hrs | Fine-grained, white, cracked |
| 6 | None | Clear glass |
| 6 | 900°-1 hr | Glassy transparent |
| 6 | 1000°-1 hr | Glassy white |
| 6 | 1100°-2 hrs | Very fine-grained, white, slight sag |
| 7 | 900°-2 hrs | Glassy, purplish, transparent |
| 7 | 1100°-2 hrs | Very fine-grained, white, sagged |
| 8 | 900°-2 hrs | Glassy, grayish, transparent |
| 8 | 1000°-2 hrs | Very fine-grained, white, translucent |
| 9 | None | Clear glass, cord, seeds, blisters |
| 9 | 900°-2 hrs | Glassy transparent, seedy |
| 9 | 1000°-2 hrs | Very fine-grained, gray, translucent |
| 9 | 1100°-2 hrs | Very fine-grained, white, sagged |
| 10 | 900°-2 hrs | Very fine-grained, gray, transparent |
| 10 | 1100°-2 hrs | Very fine-grained, blue-gray translucent |
| 11 | None | Clear glass, seedy |
| 11 | 900°-2 hrs | Transparent, slight haze |
| 11 | 1000°-2 hrs | Gray, translucent, opal, sagged |
| 12 | None | Clear glass, seedy |
| 12 | 1000°-2 hrs | Glassy white, sagged |
| 13 | 1000°-2 hrs | Very fine-grained, |

TABLE II-continued

| | | |
|---|---|---|
| 14 | 900°-2 hrs | white, sagged Clear, very slight bluish haze |
| 14 | 1000°-2 hrs | Glassy, grayish-white |
| 15 | None | Blue-white, translucent |
| 15 | 900°-2 hrs | Glassy, dense white |
| 15 | 1000°-2 hrs | Fine-grained, white, slightly hygroscopic |
| 16 | None | Clear, slightly hazy |
| 16 | 900°-2 hrs | Glassy, translucent, white |
| 16 | 1000°-2 hrs | Fine-grained, white |
| 17 | None | Clear/cloudy glass |
| 17 | 900°-2 hrs | Very fine-grained, white, translucent, cracked |
| 17 | 1000°-2 hrs | Very fine-grained, white, cracked |
| 17 | 1100°-2 hrs | Fine-grained, white, cracked |
| 18 | 900°-2 hrs | Glassy, hazy bluish white |
| 18 | 1000°-2 hrs | Very fine-grained, white, few clear streaks |
| 18 | 1100°-2 hrs | Fine-grained, white |
| 19 | 900°-2 hrs | Glassy transparent, cracked |
| 19 | 1000°-2 hrs | Very fine-grained, white, some translucent cord |
| 19 | 1200°-2 hrs | Fine-grained, white, surface glazed |
| 20 | 900°-2 hrs | Glassy, white translucent |
| 20 | 1000°-2 hrs | Very fine-grained, white |
| 20 | 1100°-2 hrs | Very fine-grained, white |
| 21 | None | Clear, slightly hazy glass |
| 21 | 1000°-2 hrs | Glassy, translucent, white |
| 22 | None | Clear glass, slightly cordy |
| 22 | 1000°-2 hrs | Glassy, translucent, white, sagged |
| 23 | None | Clear glass, slightly cordy |
| 23 | 1000°-2 hrs | Glassy, translucent, white, sagged |

| Example | Crystal Phases | Coef. Exp. | Density |
|---|---|---|---|
| 1 | $BPO_4(5)$ | — | — |
| 2 | — | — | — |
| 2 | $BPO_4(5)$ | — | — |
| 3 | — | — | — |
| 3 | $BPO_4(3)$ | 58.7 | 2.569 |
| 3 | $BPO_4(4)$ | — | — |
| 3 | $BPO_4(5)$ | — | — |
| 4 | $BPO_4(3)$ | — | — |
| 4 | $BPO_4(4)$ | — | — |
| 4 | $BPO_4(5)$ | — | — |
| 5 | $BPO_4(3)$ | — | — |
| 5 | $BPO_4(4)$ | — | — |
| 5 | $BPO_4(5)$ | — | — |
| 6 | — | 53.0 | 2.391 |
| 6 | $BPO_4(3)$ | 51.7 | 2.489 |
| 6 | $BPO_4(4)$ | 51.5 | 2.495 |
| 6 | $BPO_4(5)$ | — | — |
| 7 | $BPO_4(2+)$ | — | — |
| 7 | $BPO_4(3)$ | — | — |
| 8 | $BPO_4(2+)$ | — | — |
| 8 | $BPO_4(3)$ | — | — |
| 9 | — | 49.1 | 2.354 |
| 9 | $BPO_4(2)$ | — | — |
| 9 | $BPO_4(3)$ | 45.8 | 2.429 |
| 9 | — | — | — |
| 10 | $BPO_4(2)$ | — | — |
| 10 | $BPO_4(3)$ | — | — |
| 11 | — | — | — |
| 11 | $BPO_4(2)$ | — | — |
| 11 | — | — | — |
| 12 | — | — | — |
| 12 | — | — | — |
| 13 | $BPO_4(5)$ | — | — |
| 14 | $BPO_4(3)$ | — | — |
| 14 | $BPO_4(4)$ | 52.4 | 2.444 |
| 15 | — | — | — |
| 15 | $BPO_4(3), H_3BO_3(2)$ | 56.3 | 2.339 |
| 15 | $BPO_4(4), H_3BO_3(1)$ | — | — |
| 16 | — | 54.0 | 2.349 |
| 16 | $BPO_4(4), H_3BO_3(1)$ | — | — |
| 16 | $BPO_4(4+), H_3BO_3(2)$ | — | — |
| 17 | — | — | — |
| 17 | $BPO_4(3)$ | 63.2 | 2.69 |
| 17 | $BPO_4(4)$ | — | — |
| 17 | $BPO_4(5)$ | — | — |
| 18 | $BPO_4(3)$ | 58.5 | — |
| 18 | $BPO_4(4)$ | 58.3 | 2.574 |
| 18 | $BPO_4(4+)$ | 57.3 | 2.573 |
| 19 | $BPO_4(3)$ | — | — |
| 19 | $BPO_4(4)$ | — | — |
| 19 | $BPO_4(5)$ | 54.2 | 2.603 |
| 20 | $BPO_4(3)$ | 57.2 | 2.567 |
| 20 | $BPO_4(4)$ | 56.5 | 2.570 |
| 20 | $BPO_4(5)$ | 56.2 | 2.570 |
| 21 | — | — | — |
| 21 | $BPO_4(4)$ | — | — |
| 22 | — | 52.3 | 2.445 |
| 22 | $BPO_4(3)$ | — | — |
| 23 | — | — | — |
| 23 | — | — | — |

As can be observed from the above table, the glass-ceramic bodies resulting from a number of the above compositions are transparent, or nearly so, following a heat treatment in the vicinity of 900° C. for a few hours. Longer periods of heat treatment, especially at higher temperatures, cause the very fine-grained $BPO_4$ crystals to enlarge in size such that they begin to scatter light. Whereas the above bodies demonstrate crystallinities in the vicinity of about 50% by volume after a few hours at 900° C., higher temperatures appear to lead to even higher volumes of crystallinity. Because of this apparent high crystallinity vis-a-vis the mole percentage of $BPO_4$ theoretically possible in the compositions, it can be postulated that a $BPO_4$ solid solution with $SiO_2$ is present. Therefore, the term $BPO_4$ includes $BPO_4$ solid solutions with $SiO_2$.

As also can be observed from a study of Tables I and II, the coefficients of thermal expansion generally decrease with increasing $SiO_2$ content; the densities are highest toward the $P_2O_5$ apex of the composition diagram and lowest toward the $B_2O_3$ apex.

Chemical durabilities of the pseudobinary $BPO_4$—$SiO_2$ glasses are typically quite poor; however, glass-ceramics prepared therefrom exhibit a dramatic increase, as is illustrated in Table III. Table III records the acid, base, and distilled water durabilities of Example 6 (molar ratio $B_2O_3:P_2O_5:2SiO_2$) for both the parent glass and the glass-ceramic derived through a two-hour heat treatment at 900° C. of the parent glass.

Weighed samples having polished surfaces were immersed into the solutions for the times and temperatures noted in Table III. Thereafter, the samples were removed from the solution, dried, and re-weighed. The weight loss per unit surface area was then calculated in terms of $mg/cm^2$.

TABLE III

| | Glass | Glass-Ceramic |
|---|---|---|
| 5% by weight HCl, 24 hrs., 95° C. | 64 | 0.03 |
| 0.2N $Na_2CO_3$, 6 hrs., 45° C. | 8.3 | 0.16 |
| $H_2O$, 24 hrs., | 12.0 | 0.01 |

TABLE III-continued

|  | Glass | Glass-Ceramic |
| --- | --- | --- |
| 95° C. |  |  |

As can be seen, the glass-ceramic demonstrates over a $10^3$ improvement durability in acid and water, and nearly a fifty-fold improvement in the dilute base. Removal of $BPO_4$ from the glassy phase leaves a much more durable residual glass (very high $SiO_2$ content) which protects the crystals dispersed therein from dissolution. As can be observed, $H_3BO_3$ begins to appear in x-ray diffraction patterns in major amounts when the $B_2O_3$ content approaches 35%. The development of hygroscopicity in the glass-ceramic bodies is a direct result of its presence.

I claim:

1. A transparent, translucent, or opaque glass-ceramic article containing $BPO_4$ as the predominant crystal phase consisting essentially, expressed in terms of weight percent on the oxide basis, of about $SiO_2$: 10–50
$B_2O_3$: 5–35
$P_2O_5$: 25–75
$SiO_2 + P_2O_5 + B_2O_3$: >90.

2. A glass-ceramic article according to claim 1 also containing up to 10% by weight total of at least one oxide of the group consisting of $Li_2O$, $Na_2O$, $MgO$, $CaO$, $SrO$, $BaO$, $CdO$, $ZnO$, and $SnO_2$, with individual amounts of each oxide not exceeding about 5%.

* * * * *